US009374476B2

(12) United States Patent
Kahn et al.

(10) Patent No.: US 9,374,476 B2
(45) Date of Patent: Jun. 21, 2016

(54) SYSTEM AND METHOD FOR NETWORK ACCESS VENDING

(75) Inventors: Colin Kahn, Morris Plains, NJ (US); Sankaranarayanan Sathyanarayan, Stewartsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 548 days.

(21) Appl. No.: 13/404,255

(22) Filed: Feb. 24, 2012

(65) Prior Publication Data
US 2013/0225122 A1 Aug. 29, 2013

(51) Int. Cl.
*H04M 11/00* (2006.01)
*H04M 15/00* (2006.01)
*H04L 12/14* (2006.01)
*G06Q 30/02* (2012.01)

(52) U.S. Cl.
CPC ....... *H04M 15/8033* (2013.01); *G06Q 30/0206* (2013.01); *H04L 12/1407* (2013.01); *H04L 12/1442* (2013.01); *H04L 12/1485* (2013.01); *H04L 12/1489* (2013.01); *H04L 12/1496* (2013.01); *H04M 15/46* (2013.01); *H04M 15/8027* (2013.01); *H04M 15/8083* (2013.01); *H04M 2215/0192* (2013.01)

(58) Field of Classification Search
CPC ....................................................... H04L 9/32
USPC ................... 455/426.1, 552.1, 705
See application file for complete search history.

(56) References Cited

U.S. PATENT DOCUMENTS

| 5,303,297 A * | 4/1994 | Hillis ............................ 455/406 |
| 8,761,787 B2 * | 6/2014 | Chen et al. ................. 455/452.1 |
| 2006/0253294 A1 | 11/2006 | Martti |
| 2010/0145814 A1 * | 6/2010 | Meghani et al. ................ 705/26 |

FOREIGN PATENT DOCUMENTS

| JP | 2001127756 A | 5/2001 |
| JP | 2004048289 A | 2/2004 |
| JP | 2006180038 A | 7/2006 |
| JP | 201009418 A | 5/2010 |

(Continued)

OTHER PUBLICATIONS

The International Search Report And The Written Opinion Of The International Searching Authority, Or The Declaration in PCT/US2013/026583, mailed Mar. 19, 2014, Alcatel Lucent Applicant, 10 pages.

*Primary Examiner* — Charles Appiah
*Assistant Examiner* — Randy Peaches
(74) *Attorney, Agent, or Firm* — Tong, Rea, Bentley & Kim, LLC

(57) ABSTRACT

A system, method and apparatus for vending network access by determining access pricing or tariffs for one or more of a plurality of network access regions using one or more of an eNB cell congestion level, an eNB congestion level, a quality of service level, an access technology, a level of activity by a target subscriber and the like. The access pricing is offered to potential access purchasers along with optional metadata indicative of, illustratively, user equipment and network parameters associated with the cell or eNB. The pricing may be offered via an API to allow automatic purchase decisions by access purchasers.

17 Claims, 7 Drawing Sheets

(56) References Cited

FOREIGN PATENT DOCUMENTS

| WO | WO 99/65184 | 12/1999 |
| WO | WO 03/065741 A1 | 8/2003 |
| WO | WO 2011/098920 A1 | 8/2011 |
| WO | WO 2010/138638 A1 | 12/2012 |

* cited by examiner

400

US 9,374,476 B2

SYSTEM AND METHOD FOR NETWORK ACCESS VENDING

FIELD OF THE INVENTION

The invention relates generally to managing network resources and, more specifically but not exclusively, adapting resource pricing according to dynamic conditions.

BACKGROUND

Wireless access providers are experiencing explosive growth in data traffic due to smart phones, tablets, shared networking devices as well as new applications and services. These devices typically receive services from internet based applications and services rather than from providers' own domains.

The present provider model is one of selling access or capacity to subscribers, with plans that typically impose a monthly usage allowance. For a fixed fee, subscribers can receive content independent of the network conditions. In response, users of network capacity are sensitive to their total consumption but not sensitive to network loading levels such that bandwidth consuming applications are used independent of the impact on the network.

To satisfy user needs, access providers must build out their networks to handle large peaks in subscriber traffic. This situation is particularly problematic for the air interface, where the limited volume of traffic does not provide the same degree of statistical multiplexing as in the core network. Air interface traffic peaks typically occur only during limited time periods and on a limited number of cells. This leaves a huge amount of network data carrying capacity idle during non-peak periods and therefore not monetized.

BRIEF SUMMARY

Various deficiencies of the prior art are addressed by the present invention of a method, system and apparatus to provide a market in which network access itself (rather than just bandwidth consumption) is offered as a commodity for purchase by third parties at a price defined by contemporaneous network conditions, service level or tier, co-sponsorship or advertising subsidy and the like.

Various embodiments for vending network access contemplate determining access pricing or tariffs for one or more of a plurality of network access regions using one or more of an eNB cell congestion level, an eNB congestion level, a quality of service level, an access technology (e.g., 2G vs. 3G vs. 4G), a level of activity by a target subscriber and the like. The pricing is offered to potential access purchasers along with optional metadata indicative of, illustratively, user equipment and network parameters associated with the cell or eNB. The pricing may be offered via an API to allow automatic purchase decisions by access purchasers, such as when pricing conditions are appropriate.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be described within the context of a method, system and apparatus to provide a market in which network access itself (not just bandwidth consumption) is offered as a commodity for purchase by third parties at a price defined by contemporaneous network conditions, service level or tier, co-sponsorship or advertising subsidy and the like.

Although primarily depicted and described herein within the context of providing, illustratively, an access marketplace to sell access to a 4G LTE wireless network, it will be appreciated that the access marketplace is readily adapted to vending access to other wireless networks such as 3GPP, 3GPP2, 4G, LTE, UMTS, EV-DO, 802.11, WiMAX and the like, as well as non-wireless networks or combinations of wireless and non-wireless networks. Thus, the various network elements, links and other functional entities described herein with respect to an LTE network may be broadly construed to also describe corresponding network elements, links and other functional entities associated with various other types of wireless and non-wireless networks.

Generally speaking, the various embodiments discussed herein provide a mechanism for establishing an access network market to sell wireless network access (or other network access) to third parties access purchasers (APs) such as application service providers, application content providers, machine to machine (M2M) service providers and the like. Using the various embodiments described herein, network access providers are able to monetize what is arguably the most valuable commodity they possess; namely, connectivity to mobile devices by various application services and service providers, and to do so in a manner that applies the principle of supply and demand to a limited resource, network capacity.

Figure 1:
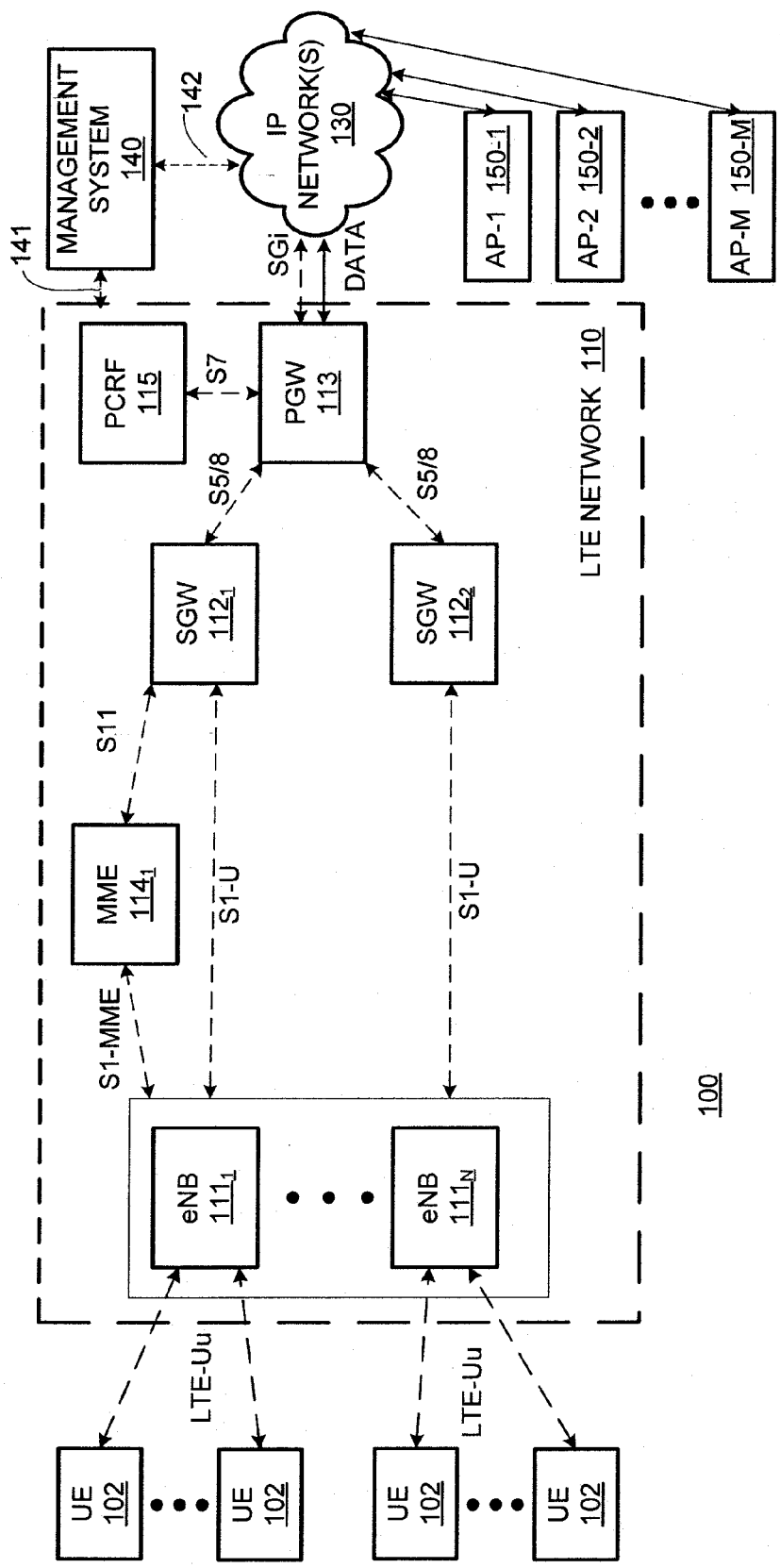
FIG. 1 depicts an exemplary communication system benefiting from an embodiment.

FIG. 1 depicts an exemplary wireless communication system including management and backup/protection functions according to an embodiment. Specifically, FIG. 1 depicts an exemplary wireless communication system 100 that includes a plurality of User Devices (UDs) or User Equipment (UE) 102, a Long Term Evolution (LTE) network 110, IP networks 130, a network management system (MS) 140 and a plurality of Access Purchasers (AP) 150.

The LTE network 110 supports communications between the UDs 102 and IP networks 130, which in turn supports communications to the APs 150.

The MS 140 is configured for supporting various management functions for LTE network 110. The configuration and operation of LTE networks will be understood by one skilled in the art.

The exemplary UDs 102 are wireless user devices capable of accessing a wireless network, such as LTE network 110. The UDs 102 are capable of supporting control signaling in support of the bearer session(s). The UDs 102 may be mobile phones, personal digital assistants (PDAs), computers, tablets devices or any other wireless user device.

The exemplary LTE network 110 includes, illustratively, a plurality of eNodeBs $111_1$ through $111_N$ (collectively, eNodeBs 111), one or more Serving Gateways (SGWs) $112_1$ and $112_2$ (collectively, SGWs 112), a Packet Data Network (PDN) Gateway (PGW) 113, a Mobility Management Entity (MME) 114, a Policy and Charging Rules Function (PCRF) 115 and various other network elements (not shown) supporting control plane and/or data plane operations. The eNodeBs 111 provide a radio access interface for UDs 102. The SGWs 112, PGW 113, MME 114, and PCRF 115, as well as other components which have been omitted for purposes of clarity, cooperate to provide an Evolved Packet Core (EPC) network supporting end-to-end service delivery using IP.

The eNodeBs 111 support communications for UDs 102. As depicted in FIG. 1, each eNodeB 111 supports a respective plurality of UDs 102. The communication between the eNodeBs 111 and the UDs 102 is supported using LTE-Uu interfaces associated with each of the UDs 102.

The SGWs 112 support communications for eNodeBs 111 using, illustratively, respective S1-u interfaces between the SGWs 112 and the eNodeBs 111. The S1-u interfaces support, illustratively, per-bearer user plane tunneling and inter-eNodeB path switching during handover.

As depicted in FIG. 1, either or both of SGW $112_1$ and SGW $112_2$ supports communications for the various eNodeBs 111. It will be appreciated that a single SGW 112 may be used to provide this support, or that more than two SGWs 112 may be used.

The PGW 113 supports communications for the SGWs 112 using, illustratively, respective S5/S8 interfaces between PGW 113 and SGWs 112. The S5 interfaces provide functions such as user plane tunneling and tunnel management for communications between PGW 113 and SGWs 112, SGW relocation due to UD mobility, and the like. The S8 interfaces, which may be Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and IP networks 130 via an SGi interface.

The MME 114 provide mobility management functions in support of mobility of UDs 102. The MME 114 supports the eNodeBs 111 using, illustratively, respective S1-MME interfaces which provide control plane protocols for communication between the MME 114 and the eNodeBs 111.

The PCRF 115 provides dynamic management capabilities by which the service provider may manage rules related to providing Quality of Service (QoS) via LTE network 110 and rules related to charging for services provided via LTE network 110.

As depicted and described herein with respect to FIG. 1, elements of LTE network 110 communicate via interfaces between the elements. The LTE network 110 includes an Evolved Packet System/Solution (EPS). In one embodiment, the EPS includes EPS nodes (e.g., eNodeBs 111, SGWs 112, PGW 113, MME 114, and PCRF 115) and EPS-related inter-connectivity (e.g., the S* interfaces, the G* interfaces, and the like). The EPS-related interfaces may be referred to herein as EPS-related paths.

The IP networks 130 include one or more packet data networks via which UDs 102 may access content, services, and the like.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP networks 130. In one embodiment, for example, MS 140 may communicate with LTE network 110 via a communication path 142 which is supported by IP networks 130. The communication paths 141 and 142 may be implemented using any suitable communications capabilities. The MS 140 may be implemented as a general purpose computing device or specific purpose computing device, such as described below with respect to FIG. 2 or 5.

The Access Purchasers (AP) 150 comprise third-party entities such as Access Content Providers (ACPs), Application Service Providers (ASPs), machine to machine (M2M) service providers or monitoring entities and the like. These third-party entities may have a separate contractual relationship with subscribers/users of the LTE network 110, where the subscribers/users access the LTE network 110 via respective UD/UE 102.

In some cases, access purchasers entities may choose to pay for some or all of the cost of providing content, application services, M2M services and the like to subscriber UDs 102. The various embodiments are adapted for use within a number of different business scenarios/applications, which will be described below in more detail.

Figure 2:
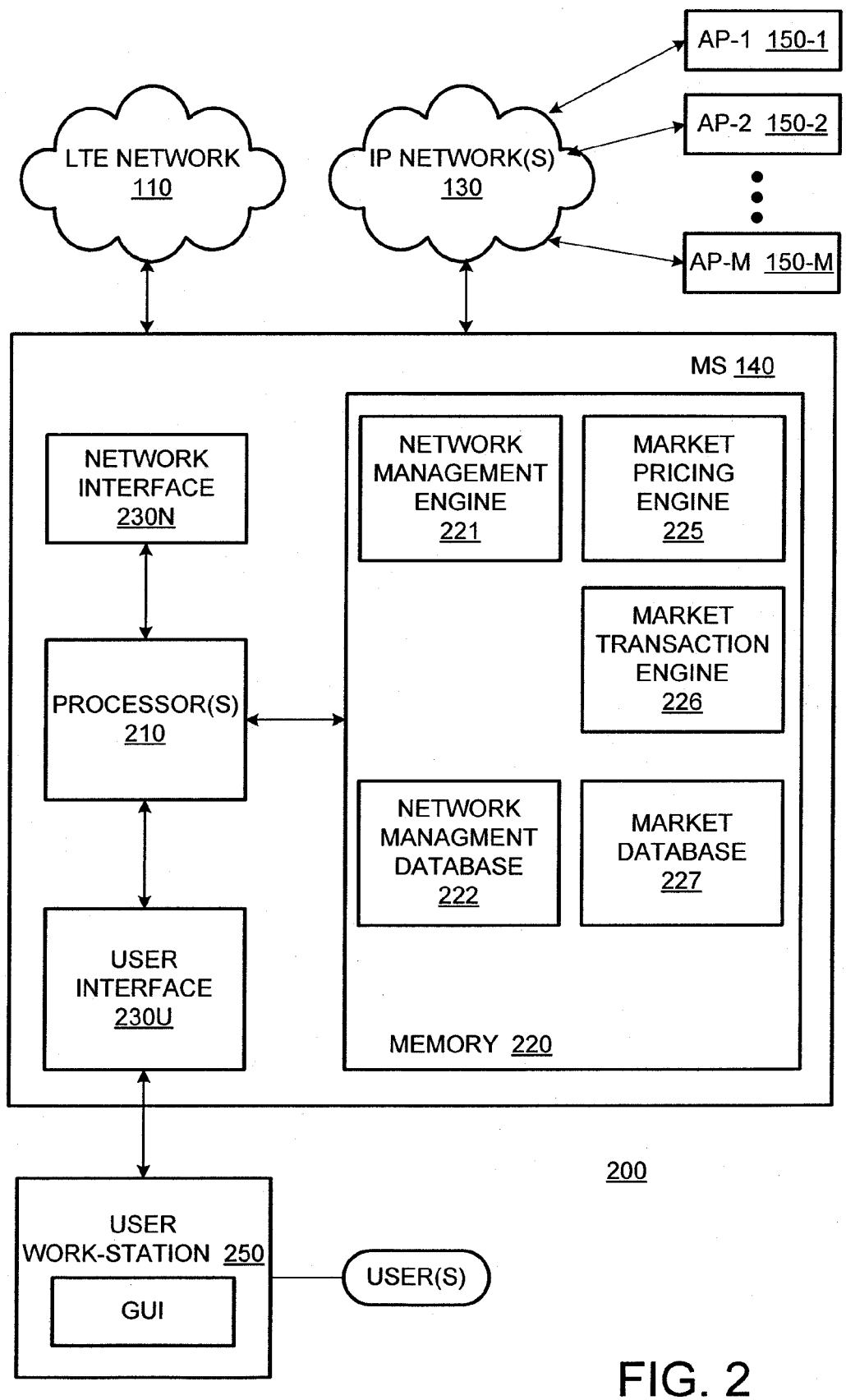
FIG. 2 depicts an exemplary management system suitable for use in communication system of FIG. 1.

FIG. 2 depicts an exemplary management system suitable for use in the communications system of FIG. 1. As depicted in FIG. 2, MS 140 includes one or more processor(s) 210, a memory 220, a network interface 230N, and a user interface 230U. The processor(s) 210 is depicted as being coupled to each of the memory 220, the network interface 230N, and the user interface 230U, though other computer architectures are also suitable for use within the context of the management system 140.

The processor(s) 210 is adapted to cooperate with the memory 220, the network interface 230N, the user interface 230U, and the support circuits 240 to provide various management functions for LTE network 110 as well as for the various access market embodiments discussed herein.

The memory 220, generally speaking, stores programs, data, tools and the like that are adapted for use in providing various management functions for LTE network 110 as well as for the various access market embodiments discussed herein.

The memory 220 illustratively includes a network management engine (NME) 221, a network management database (NMD) 222, a market pricing engine (MPE) 225, a market transaction engine (MTE) to 26 and a market database 227. In one embodiment, the NME 221, MPE 225 and MTE 226 are implemented using software instructions which may be executed by processor (e.g., processor(s) 210) for performing the various management functions depicted and described herein.

The NMD 222 and MD 227 each store data which may be generated by and used by various ones and/or combinations of the engines and tools of memory 220. The NMD 222 and MD 227 may be combined into a single database or implemented as respective databases, memory structures and/or portions thereof. Either of the combined or respective databases may be implemented as single databases or multiple databases according to various arrangements as known to those skilled in the art.

Although depicted and described with respect to an embodiment in which each of the engines and databases are stored within memory 120, it will be appreciated by those skilled in the art that the engines and databases may be stored in one or more other storage devices internal to MS 140 and/or external to MS 140. The engines and databases may be distributed across any suitable numbers and/or types of storage devices internal and/or external to MS 140. The memory 220, including each of the engines and/or databases of memory 220, is described in additional detail herein below.

The network interface 230N is adapted to facilitate communications with LTE network 110 and IP network(s) 130. For example, network interface 230N is adapted to interact with various management entities within the LTE network 110 to perform various network management functions, including receiving information adapted for use in determining the topology, operating conditions, utilization levels, congestion levels, alarm conditions, status conditions and so on associated with the operations of the LTE network 110. The interface 110 is also used to signal pricing changes to the LTE network so they may be applied to content sent by APs. For example in one embodiment the network interface 230N may be used to signal to the PCRF 115 that a new charging rule should be applied for packet flows from APs. Similarly, network interface 230N is adapted to interact with access purchasers 150 via, illustratively, one or more IP networks 130 implement various access market functions such as described herein.

The user interface 230U is adapted to facilitate communications with one or more user workstations (illustratively, user workstation 250), for enabling one or more network operations center (NOC) or other management users to perform management functions associated and/or access market functions. The communications include communications to user workstation 250 (e.g., for presenting imagery generated by MS 140) and communications from user workstation 250 (e.g., for receiving user interactions with information presented via user workstation 250). Although primarily depicted and described as a direct connection between MS 140 and user workstation 250, it will be appreciated that the connection between MS 140 and user workstation 250 may be provided using any suitable underlying communication capabilities, such that user workstation 250 may be located proximate to MS 140 (e.g., such as where both MS 140 and user workstation 250 are located within a Network Operations Center (NOC)) or remote from MS 140 (e.g., such as where communications between MS 140 and user workstation 250 may be transported over long distances).

Although primarily depicted and described herein with respect to one user workstation, it will be appreciated that MS 140 may communicate with any suitable number of user workstations, such that any number of users may perform management functions for LTE network 110 (e.g., such as where a team of technicians at a NOC access MS 140 via respective user workstations for performing various management functions for LTE network 110). Although primarily depicted and described with respect to user workstations, it will be appreciated that user interface 230U may be adapted to support communications with any other devices suitable for use in performing the various functions discussed herein.

As described herein, memory 220 includes the NME 221, NMD 222, MPE 225, MTE 226 and MD 227, which cooperate to provide the various functions depicted and described herein. Although primarily depicted and described herein with respect to specific functions being performed by and/or using specific ones of the engines and/or databases of memory 220, it will be appreciated that any of the management functions depicted and described herein may be performed by and/or using any one or more of the engines and/or databases of memory 220.

Network Management Engine

The network management engine (NME) 221 is generally adapted for providing various network management functions associated with, illustratively, LTE network 110. The NME performs various network management functions as known to those skilled in the art. Such functions include, illustratively, discovery of network elements and their interconnections, provisioning paths to the network, and monitoring various performance parameters associated with network elements, links and/or portions thereof.

Thus, in addition to various other functions, the network management engine 221 retrieves configuration information, status/operating information and connection information regarding the elements, sub-elements and links forming the LTE network 110. Much of this information is dynamic and the retrieval of this information by the network management engine 221 is ongoing. For example, the underlying elements, sub-elements and links within the LTE network may change over time due to local network adaptations, rerouting, failures, degradations, scheduled maintenance and the like. In general, the network management engine 221 is adapted to provide management and monitoring of the various elements, sub-elements and links forming the LTE network 110.

Configuration information comprises information identifying a network element, the function and/or configuration of the network element, the function and/or configuration of the sub-elements forming a network element and so on. Configuration information illustratively includes, but is not limited to, information identifying the type of network element, protocols supported by the network element, services supported by the network element and so on. Configuration information illustratively includes information attending to the various sub-elements within the network element, such as the input ports, switches, buffers, and output ports and so on associated with the sub-elements forming a network element.

Status/operating information comprises status/operating information associated with the operating state of the network element and/or the sub-elements forming a network element. Status/operating information illustratively includes, but is not limited to, information providing operating status/alarm indicators, including information pertaining to metrics such as packet count, utilization level, component pass/fail indication, bit error rate (BER) and the like. Status information may be obtained directly from network elements, from network elements via independent probes, or from information obtained from the UE 102.

Connection information comprises information useful in ascertaining or inferring the connections between network elements and/or sub-elements, such as the source of data received from the network element or its sub-elements, the destination of data transmitted by the network element or its sub-elements and so on. Connection information illustratively includes, but is not limited to, source address information associated with received packets, destination address information associated with transmitted packets, protocol information associated with packet flows, service information associated with packet flows, deep packet inspection results data and the like.

The network management engine 221 stores configuration information, status/operating information, connection information and other information useful in performing the various management functions within the network management database (NMD) 222.

Market Pricing Engine

The market pricing engine (MPE) 225 performs various functions associated with determining prices to be paid by third parties such as application content providers, application service providers, machine to machine (M2M) service providers and the like to access one or more portions of the LTE network 110. Various factors enter into the pricing determination mechanism, including one or more of local network congestion levels, intermediate network congestion levels, requested service levels (gold, silver and bronze tiers, for example), most favored buyer status, pre-existing business arrangements, pre-existing service level agreements, advertising offset opportunities and so on. Generally speaking, the cost of access via the LTE network 110 increases as the network becomes more utilized and decreases as the network becomes less utilized, as will be discussed in more detail below.

The market pricing engine 225 stores current and, optionally, historical market pricing information within the market database (MD) 227. The market pricing engine 225 interfaces to the LTE network and ensures that current pricing levels are applied to data sent to/from the APs.

Market Transaction Engine

The market transaction engine (MTE) 225 performs various functions associated with access purchases and other transactions with the various access purchasers (APs), such as access content providers, application service providers, machine to machine service/monitoring providers or any other entity interested in purchasing network access for itself or its customers.

The market transaction engine 225 interacts with access purchasers 150 to advertise/offer network access at various regions, various prices and so on as determined by the market pricing engine 225. The various regions may comprise individual mobile sites such as a base station or eNodeB, specifically defined geographic regions such as a city or other delineated region.

Access Market Embodiments

It will be appreciated by those skilled in the art that the functions of the market pricing engine 225, market transaction engine 226 and/or market database 227 may be implemented as part of the management system 140 as depicted herein, as part of a dedicated computing system/server located proximate or remote from the management system 140, or as part of a standalone access market brokering system.

Per Cell Market Example

Various embodiments will now be discussed within the context of vending access to wireless network users associated with a particular region; namely, a single cellular region such as associated with one base station or eNodeB.

Figure 3:
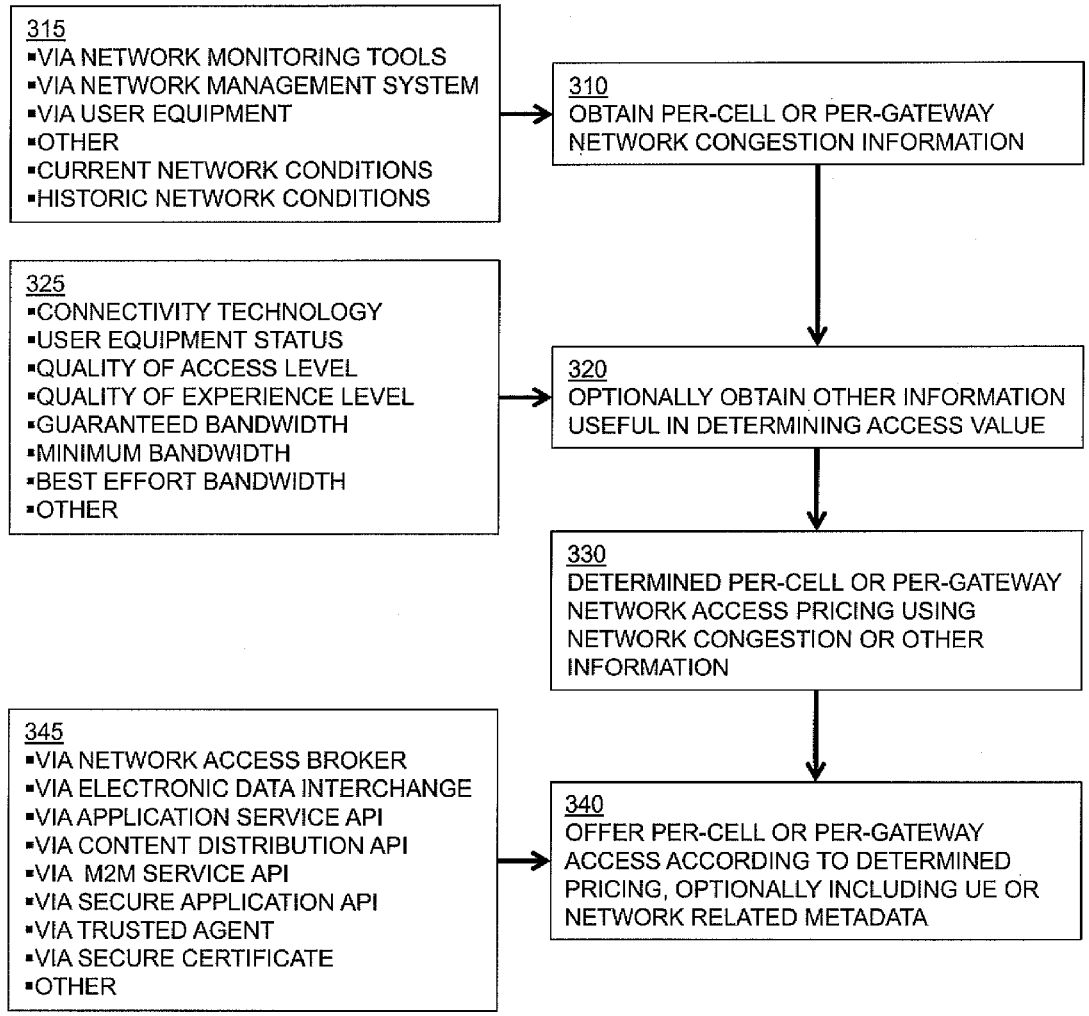
FIGS. 3-4 depict flow diagram of a methods according to various embodiments.

FIG. 3 depicts a flow diagram of a method according to one embodiment. Specifically, FIG. 3 depicts a method 300 suitable for use by, illustratively, the market pricing engine 225 discussed above with respect to FIG. 2.

At step 310, per-cell or per-eNB network congestion information is obtained. Referring to box 315, this information may be obtained via network monitoring tools, the network management system, user equipment or devices and so on. Moreover, the network congestion information may comprise current network conditions or historic network conditions.

For example, various network monitoring tools may be access/core network vendor agnostic, monitoring messages and transport on standardized interfaces, or the tools may be network vendor proprietary, interfacing to network elements or the OA&M systems. Per-cell or per-eNB network congestion information may include data associated with any of the air-interface, backhaul and core network. Network congestion information may also include indications of network element status, such as network node processor occupancy, memory availability and so on the may be affected by network loading/congestion.

At optional step 320, other information useful in determining network access value is obtained. Referring to box 325, such other information may include connectivity technology used (e.g., LTE, UMTS, WiFi and the like), user equipment status (e.g., processor occupancy, memory availability and the like), quality of access level (e.g. gold, silver, runs and the like), quality of experience (QoE) level, request or need for guaranteed bandwidth, minimum bandwidth, best effort bandwidth and other information/factors.

At step 330, per-cell or per-eNB network access pricing is determined using obtained network congestion information and/or other information as described herein. Generally speaking, while prices may be formulated based upon many factors such as multiple access grades and the like, congestion levels at the cell and/or eNodeB are highly determinative. Prices will tend to rise and fall in relation to congestion levels, though this relationship is not necessarily linear. Generally speaking, a network region to be associated with an access price or tariff may comprise a region serviced by one or more of an eNodeB, an eNodeB cell, a NodeB, a Node B cell, a base transceiver station (BTS), a BTS cell and so on.

At step 340, the determined per-cell or per-eNB access pricing is offered or advertised. Optionally, metadata associated with the network and/or with user equipment is included with the advertise network access price. For example, metadata identifying a user device and a cell within which the device is located will enable an access purchaser to correctly identify the appropriate cell or Gateway servicing the user device, such as to enable content streaming and the like.

Referring to box 345, the offered per-seller per-eNB network access may be advertised via a network access broker, and electronic data interchange, an application programming interface (API) for an application service, via an API for the content distribution service, via an API for an M2M service, the via a secure application API, via a trusted agent, via a secure certificate or by some other mechanism. For example, in one embodiment, pricing as well as other meta-data indicating UE status and access network state are offered via RESTful APIs interfaced to applications. The APIs pass through, illustratively, a secure interface such as a Web Services Gateway, illustratively the Alcatel-Lucent Open API Platform—OAP).

Generally speaking, the method 300 of FIG. 3 is adapted to determine pricing associated with per-cell, per-eNB or some other network access segment, such as a specific region, carrier, service class and the like. The determined pricing is offered to access purchasers via one or more mechanisms, some of which optionally include metadata useful in enabling access purchasers to identify the appropriate network access to be purchased for specific subscribers or users.

Thus, in various embodiments of a method for vending network access, access pricing or tariffs for one or more of a plurality of network access regions is determined using one or more of an eNB cell congestion level, an eNB congestion level, a quality of service level, an access technology (e.g., 2G vs. 3G vs. 4G), a level of activity by a target subscriber and the like.

Figure 4:
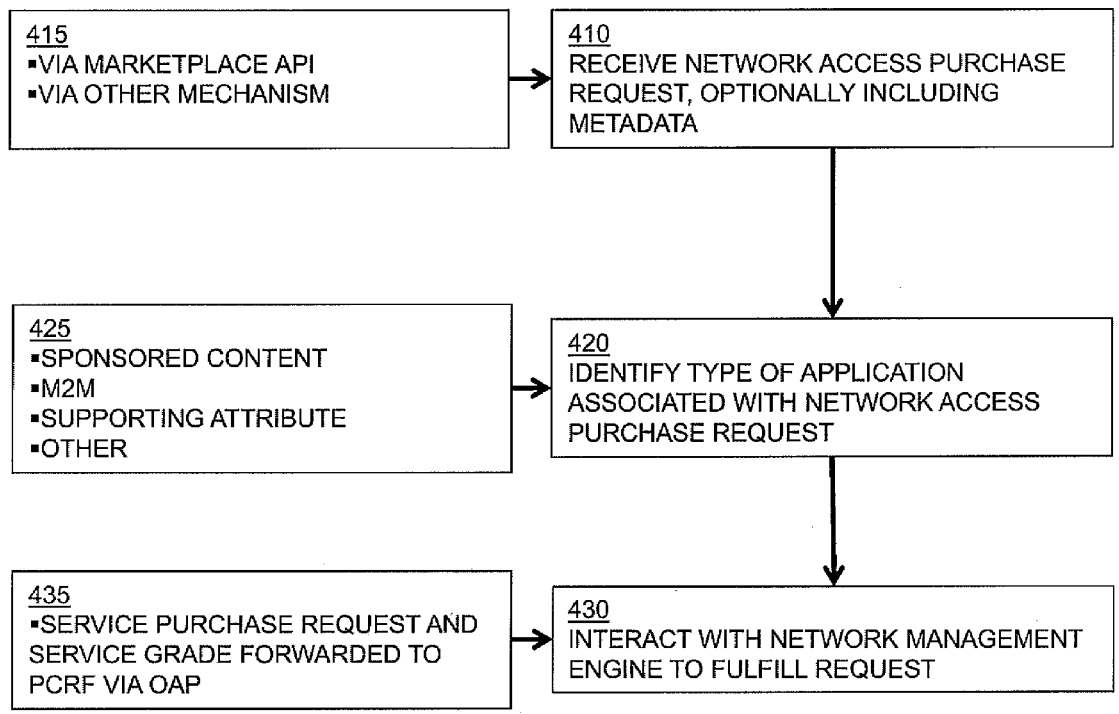

FIG. 4 depicts a flow diagram of a method according to one embodiment. Specifically, FIG. 4 depicts a method 400 suitable for use by, illustratively, the market transaction engine 226 discussed above with respect to FIG. 2. This embodiment contemplates servicing individual purchase requests via the Management System 140. Other embodiments contemplate servicing individual purchase requests via a global charging policy applied to all content sent to or received from an AP.

At step 410, a network access purchase request is received from an access purchaser (AP). Referring to box 415, the access purchase request may be received via a marketplace API such as discussed above with respect to step 340 of box 345 or via some other mechanism.

At step 420, the type of application associated with the network access purchase request is identified such that appropriate network provisioning, charging and general fulfillment requirements may be satisfied. Referring to box 425, types of applications include sponsored content applications, machine to machine (M2M) applications, applications where network access is a supporting attribute and other applications. A sponsored content application may comprise an application in which the application provider sponsors content for subscribers. The sponsored content may be an application provided promotion, selected by the subscriber as part of an offering by the application content provider, or linked to a service plan. A M2M application may comprise a threshold-triggered decision by a machine or other processing element that network access pricing is appropriate for a relevant data transfer. An application where network access is a supporting attribute may comprise a device- or appliance-dependent application by which purchased content such as books or streaming content is delivered to the device or appliance by one or more networks without a subscriber incurring further access charges for this delivery, or having the content count against a monthly usage allowance.

At step 430, interaction with the network management engine 221 is provided to fulfill the network access purchase request. For example, referring to box 435, in one 4G/LTE embodiment, the service purchase request and any service grade information is forwarded to the Policy and Charging Resource Function (PCRF) entity by the management system 140 via the OAP. Generally speaking, the PCRF adapts policy and charging based network functions to ensure that the service level associated with the access purchase request is satisfied and that the application initiating the access purchase request is appropriately charged for this network access at the determined pricing.

For example, if a better-than-best-effort level of service has been selected in the axis purchase request, in one embodiment the PCRF sets up a QoS bearer corresponding the grade of service selected using 3GPP standardized mechanisms. The PCRF also establishes a charging rule for the requested content and promulgates the information to the policy enforcement point (PGW in LTE). The LTE packet Gateway (PGW) counts packets associated with the application separately from other packets being sent to the user. If the signature (e.g., a 5-tuple or other signature) of the content is unknown or was not included within the axis purchase request, then the PGW may use DPI to detect the flow associated with the application that has purchased access. Generally speaking, the PGW operates to ensure that purchased application-related packets are not attributed to the subscriber bandwidth allocation; rather, these packets are chargeable to the network access purchasing application or entity. It is noted that the charging system, which may be an online or off-line charging system, rates the packet counts for 3rd party purchased access separately from packet counts associated with other subscriber activity.

Generally speaking, the method 400 of FIG. 4 is adapted to receive network access purchase requests from applications and interact with the network management engine and/or other network management components as necessary to fulfill the axis purchase request and charge the requesting application or entity for this service.

The various embodiments described herein advantageously allow application service providers, content providers and others to purchase access at a price that is correlated with network congestion levels and/or other factors. When congestion levels are high, the price for access rises in the marketplace, discouraging consumption of network resources in the marketplace. When network resources are idle, the price for access falls in the marketplace and applications may make purchases for delivery of their content at economical prices.

Various embodiments of the invention utilize RESTful APIs exposed by the operator that 3rd party content providers may access. The APIs provide access price information (which may be denoted in dollars or other currency units per megabyte, gigabyte or other bandwidth quantity) and metadata associated with the access being purchased. Various embodiments include the option to offer multiple tiers of service (Gold, Silver, Bronze, Guaranteed Bit Rate and the like), which tiers of service may be offered for purchased at different pricing levels. The various embodiments also include a mechanism for the applications to purchase access using REST APIs as described herein.

Various embodiments apply a current applicable charging rate for any content sent by, illustratively, pre-approved participants in the marketplace. No API need be exercised to make a purchase by the AP; the AP identifies a price advertised in the API and makes an implicit purchase decision by sending content. For M2M devices, all packets sent to the device on a cell are charged at the prevailing advertised rate for that cell. For regular subscriber devices, a traffic detection function (DPI) could detect the sponsored content flow and trigger charging against the AP rather than the subscriber. Various embodiments use a third party access broker operating as intermediary between an access price determination and/or offering mechanism and potential access purchasers.

M2M Embodiments and Applications

Machine to machine (M2M) applications comprise, illustratively, applications such as automatic inventory control of remote vending machines, numerous remote monitoring/sensor applications, automobile maintenance/update applications, firmware update applications for mobile devices and so on. These applications are typically flexible with respect to scheduling the delivery of content, updates or other data to or from a remote device. As such, where network access pricing is related to network congestion or utilization levels, scheduling such delivery for low price/congestion time periods may be achieved. In particular, various embodiments of M2M data refresh/delivery periodically monitor network access pricing levels and opportunistically schedule data refresh/delivery in response to pricing levels dropping below a maximum threshold level. In this manner, M2M costs may be controlled and possibly driven to levels sufficiently low to enable entire new classes of M2M systems or applications.

Within the context of various M2M solutions supported by the various embodiments, wireless access is a component of a dedicated service. The wireless access is preferentially purchased below threshold trigger levels to opportunistically take advantage of drops in offered access pricing. In this manner, M2M applications that have heretofore been impossible due to cost constraints may now be provided by M2M application vendors.

Sponsored Content Embodiments and Applications

Sponsored content embodiments are where application or content service providers pay some or all of the costs of delivering the application or content to subscribers via a network.

In one embodiment, special-purpose devices such as electronic readers are used to deliver content to subscribers. For example, an electronic book vendor may sell dedicated subscriber devices (e-readers) that allow subscribers to sign-up for the book delivery service where the electronic book vendor pays an access provider such as a wireless network owner to deliver content to the subscribers. Basic or minimum content only may be provided while access costs are high, while rich content may require delivery when access costs are much lower.

In one embodiment, a general purpose devices such as smart phones, netbooks, laptops or other computing devices are used to deliver content to subscribers. For example, a streaming video vendor may provide rich media content to subscribers without requiring the subscribers to consume bandwidth from their wireless network provider. In particular, streaming video vendor pays the wireless network owner to deliver the streaming media content to the subscribers. Even if the subscribers have an account with the wireless network owner, the bandwidth required to stream the content is not counted against the allocated bandwidth associated with the subscriber account. The video vendor is thus motivated to stream content at a lower rate when the cost for access is high, and may provide higher rate, higher resolution video when the network is not congested and the access price cost paid by the video vendor is low. Similarly content providers may send static picture advertisements when access costs are high, and stream video advertisements when access costs are low.

Various embodiments provide for content delivery or streaming at a guaranteed bit rate, a bit rate associated with a particular quality of experience (QoE) tier, a minimum bit rate, a best efforts bit rate and so on, where each of these delivery paradigms is associated with a determined price that changes in accordance with network conditions and other parameters.

Sponsored content may be further subsidized by including advertising with the delivered content. For example, some embodiments contemplate reducing the price for access purchasers in exchange for the access purchasers presenting advertisements to their subscribers. Further price reductions may be provided where sufficient demographic information associated with the subscribers is provided such that the advertising may be well targeted or highly relevant to the subscriber.

As an example, consider and add-on feature associated with a subscription-based sports network or other application content provider (ACP). For flat monthly fee, subscribers may access the ACP content via their home broadband connection, such as cable television, satellite television, fiber to the curb and the like. For an additional monthly fee paid to the ACP, subscribers may also access the ACP content via a wireless network on their smart phones, tablet computers, laptop peters and the like. Importantly, a portion of the additional monthly fee paid to the ACP is used by the ACP to pay for access to the wireless network such that the monthly wireless network bandwidth allocation of the subscriber is not consumed by viewing the ACP content.

The mobile operator or wireless network owner publishes pricing tariffs and the like based on network conditions and/or other factors as described herein. The ACP purchases access instantaneously or in a "spot market" fashion to satisfy subscriber demands for ACP content. In various embodiments, ACP may purchase bulk access/bandwidth from the mobile operator in anticipation of ACP subscriber demands.

In various embodiments, the ACP responds to changes in wireless access tariff pricing by adapting one or more of the video rate or quality of content, whether or not advertising is inserted into the content stream, how many advertisements are inserted within the content stream, whether or not the content stream itself is delayed until the tariff drops below a threshold level and so on. Various business modifications may be made by those skilled in the art and informed by the teachings of the present embodiments.

Figure 5:
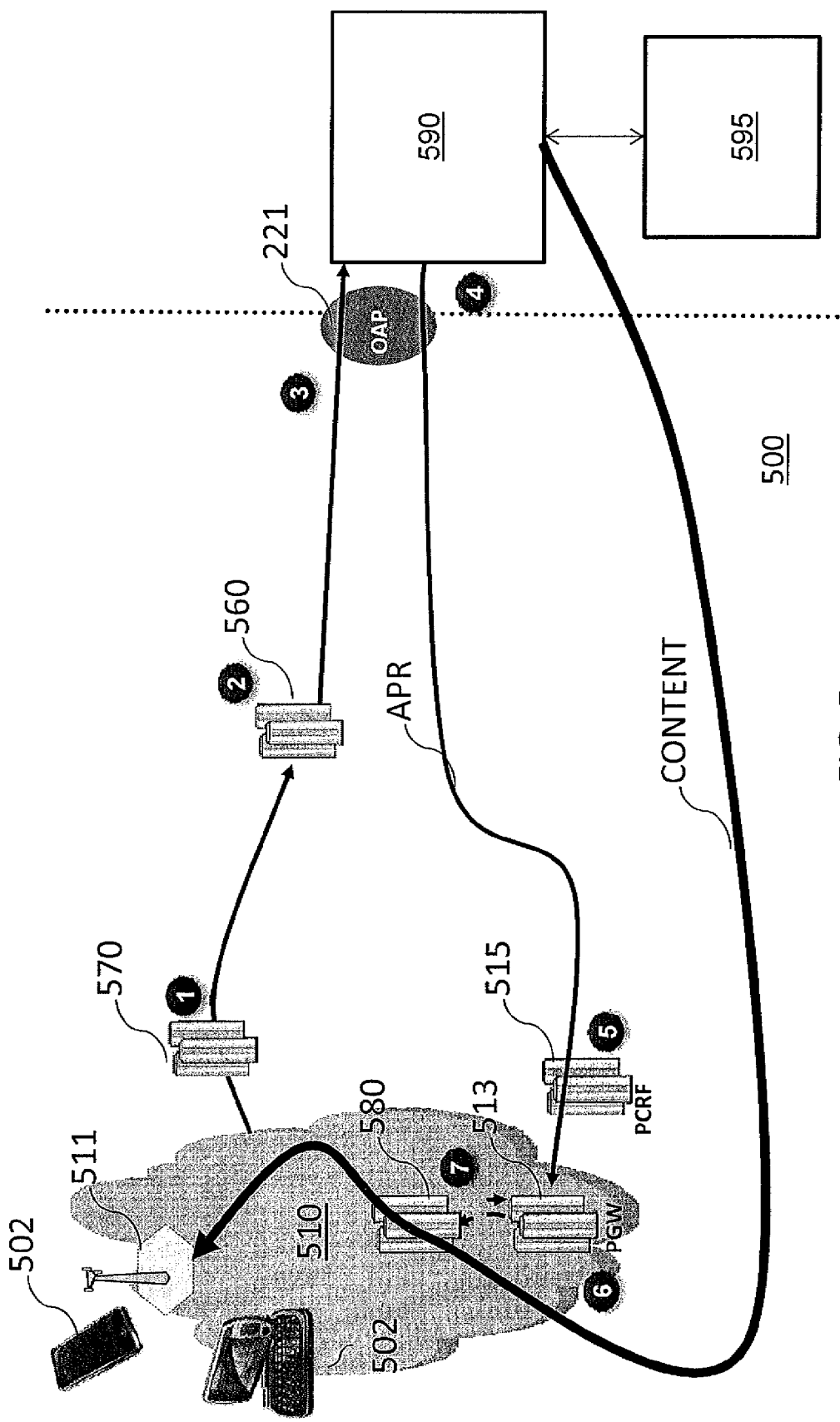
FIG. 5 depicts a high-level block diagram graphically representing an Access Market Place (AMP)

FIG. 5 depicts a high-level block diagram graphically representing an Access Market Place (AMP) using congestion pricing to advertise access network tariffs, transact with Application Content Providers (ACPs) for wireless access to their subscribers for content delivery, deliver content to the User Equipment (UE) of the subscribers, and properly charge the ACP.

Specifically, FIG. 5 depicts a system 500 including network 510 including a plurality of eNodeBs 511 serving wireless user equipment (UE) or user devices (UD) 502. The system 500 may be configured similarly to the system 100 described above with respect to FIG. 1.

At a first step (step 1), a network congestion monitoring element 570 obtains network congestion information and provides the network congestion information to an intelligent presence element 560.

In various embodiments, the network congestion monitoring element 570 comprises an ALU 9900 Wireless Network Guardian (WNG), manufactured by Alcatel-Lucent of Murray Hill, N.J. The WNG provides cell level congestion information to support Analytics and real-time service control functions. The WNG is a network vendor independent source of congestion information that AMP uses to determine pricing for access. In various embodiments, network congestion information is derived directly from the various network elements within the cell, the region including the cell and so on. Congestion information used to define access prices and tariffs may be from the network congestion monitoring element 570, from various other network elements, from the management system or from any combination thereof.

At a second step (step 2), the intelligent presence element 560 calculates third-party access pricing for each cell and adds metadata associated with the cells (e.g., RAT, UE state and the like), formulates a pricing tariff or market offer, and propagates the offer toward a marketing platform, illustratively the Alcatel-Lucent Open API Platform (OAP). In various embodiments, the network congestion information is combined metadata provided by an Alcatel-Lucent Intelligence Presence (InP) server. The metadata includes, illustratively, information that is relevant to applications that may wish to purchase access, and my include UE state (battery charge, processor occupancy, etc.) and access technology (e.g., GPRS, UMTS, LTE, etc.).

At a third step (step 3), the OAP exposes the formulated pricing tariff or market offer to application content providers (ACPs) and other entities via, illustratively, an application programming interface (API). In various embodiments, the pricing and metadata is securely exposed to the market place using RESTful APIs via the ALU Open API Platform (OAP).

At a fourth step (step 4), the ACP purchases wireless access according to the exposed or offered tariff. In various embodiments, an ACP entity 590 such as a content server, session manager or other functional element utilizes the RESTful APIs published via the Open API Platform (OAP) to effect an automated wireless access purchase transaction in response to, illustratively, a subscriber request for content received by the ACP.

For example, assuming a particular ACP subscriber requests content from the ACP in a standard manner via the subscriber's UE 502, the ACP identifies the requesting subscriber, uses the metadata to identify the specific eNodeB servicing the subscriber, and generates an access purchase request according to the tariff or pricing structure associated with the identified subscriber eNodeB. Note that the metadata may be supplied by the UE, obtained from the network or dedicated location servers, or other sources.

At a fifth step (step 5), the access purchase request is received from the ACP via the OAP and propagated toward a PCRF for proper charging and, optionally, to control or constrain QoS level via, illustratively, policy modifications and the like.

In various embodiments, content delivered at peak/expensive access times may be quality constrained with respect to content delivered at off-peak/inexpensive access times. For example, various ACPs react in different ways to changes in pricing, such as making access purchase decisions by altering their streaming video rate from high resolution, to standard resolution and to low resolution in response to price changes. Different applications may set different price-level trigger points for resolution or other QoS changes. Different applications may also set different advertising insertion policies such adapting by using video advertising, using static advertising, increasing or decreasing advertising insertion rates and so on in response to changes in access pricing.

These decisions may also take into account the relative value of the advertisement to the ACP versus the cost of presenting the advertisement to subscriber. It may be cheaper to provide content without advertising to a subscriber if the access cost of presenting the advertising to a subscriber exceeds the revenue associated with the advertising.

At a sixth step (step 6), the requested content is provided by the ACP to the user via the wireless network. In various embodiments, an ACP server 590 streams requested content to a packet Gateway (PGW) 513 associated with the wireless network 510. Optionally, advertisements received from, illustratively, an advertising server 595 are periodically inserted into the stream content. The PGW receiving the content at the edge of the wireless network identifies the packets as sponsored application packets and identifies these packets as not to be counted against the bandwidth allocation associated with the subscriber.

At a seventh step (step 7), information is transmitted from the PGW 513 to a charging (OCS) entity 580 where the volume counted by the PGW for the various flows are rated for charging purposes so ACP and the subscriber can be charged appropriately.

Figure 6:
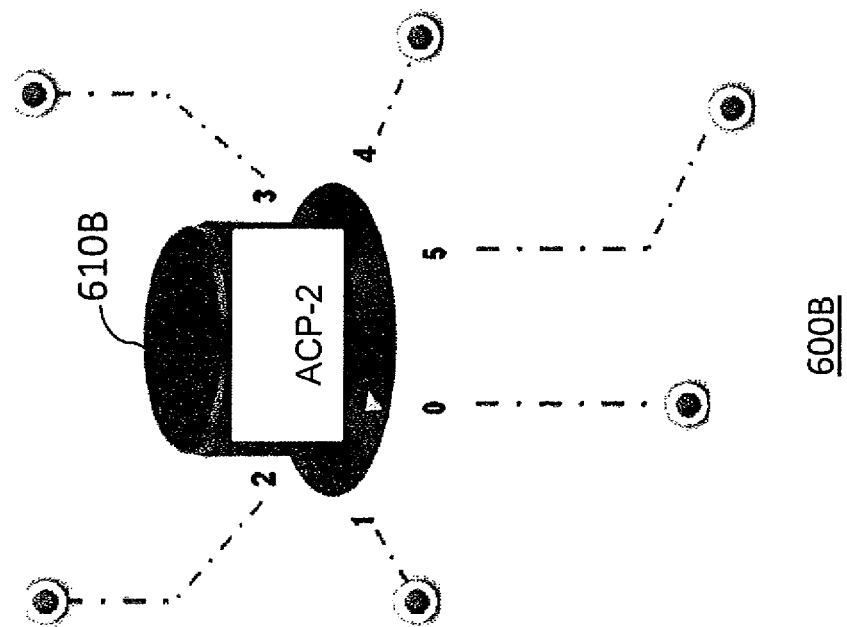
FIG. 6 graphically depicts exemplary application content provider policies for two different application content providers.
Figure 6:
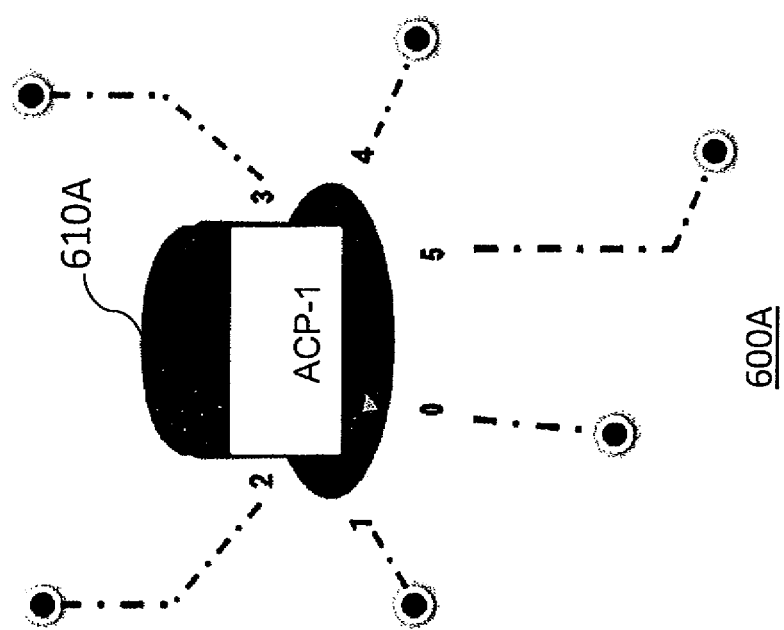

FIG. 6 graphically depicts exemplary application content provider policies for two different application content providers. Specifically, each of a first ACP 610A a second ACP 610B have established six pricing-related trigger points, where each trigger point is associated with a respective quality and/or advertising policy associated with requested content stream. That is, network access tariffs or price levels driven by network congestion levels and the like are in turn used to define quality of experience (QoE) and/or quality of service (QoS) parameters associated with content streamed to a requesting user.

The six pricing-related trigger points and related policies for the first ACP 610A are shown below in Table 1, as follows:

TABLE 1

| Price | Video | Advertising |
| --- | --- | --- |
| 0 | HD video at high bitrate | 3 Video Advertisements |
| 1 | HD video at 2-step lower bitrate | 2 Video Advertisements |
| 2 | HD video at 2-step lower bitrate | 1 Video Advertisement |
| 3 | SD video at high bitrate | 2 Static Advertisements |
| 4 | SD video at 1-step lower bitrate | 1 Static Advertisement |
| 5 | SD video at 2-step lower bitrate | No Advertisements |

The six pricing-related trigger points and related policies for the second ACP 610B are shown below in Table 2, as follows:

TABLE 2

| Price | Video | Advertising |
| --- | --- | --- |
| 0 | HD video at high bitrate | 1 Video Advertisement |
| 1 | HD video at high bitrate | 1 Video Advertisement |
| 2 | HD video at 1-step lower bitrate | 1 Video Advertisement |
| 3 | HD video at 2-step lower bitrate | 1 Video Advertisement |
| 4 | SD video at high bitrate | 2 Static Advertisements |
| 5 | SD video | No Advertisements |

The various embodiments advantageously provide an opportunity for service providers to increase revenue from application/content providers while incentivizing more efficient utilization of the network infrastructure. In particular, by shifting access costs to access purchasers having business relationships with network subscribers, the cost associated with subscriber behavior such as bandwidth consumption may be more properly allocated among the various subscribers as well as among the various access purchasers.

Figure 7:
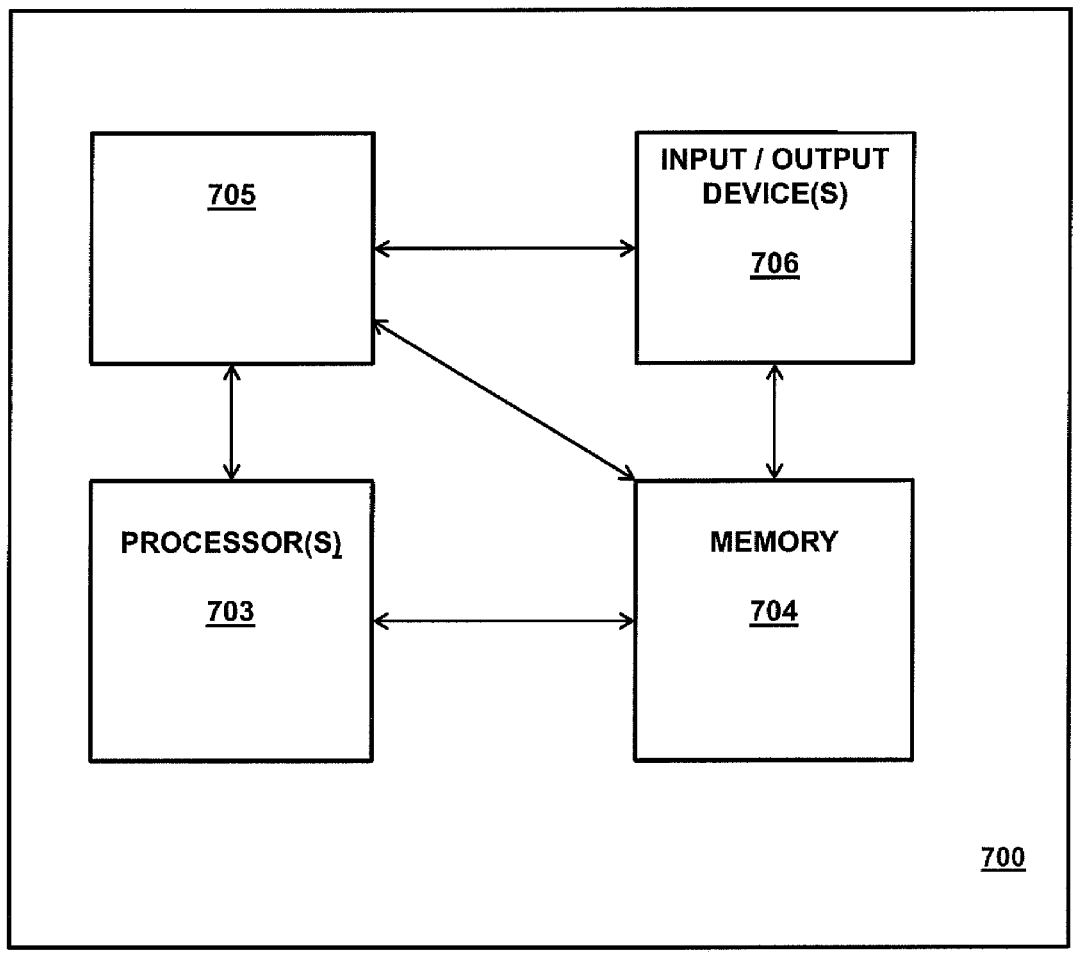
FIG. 7 depicts a high-level block diagram of a general purpose computer suitable for use in performing the functions described herein with respect to the various embodiments.

FIG. 7 depicts a high-level block diagram of a general purpose computer suitable for use in performing the functions described herein with respect to the various embodiments. In particular, the architecture and functionality discussed herein with respect to the general-purpose computer is adapted for use in each of the various switching and communication elements or nodes discussed herein with respect to the various figures; such as the UDs 102, eNodeBs 111, SGWs 112, PGW53, MMEs 114, PCRF 115, and management system 140. It will be appreciated that some of the functionality discussed herein with respect to describe general purpose computer may be implemented in various network elements or nodes, and/or a network operations center (NOC) or network management system (NMS) operative to configure and manage elements within the network.

As depicted in FIG. 7, system 700 comprises a processor element 702 (e.g., a CPU), a memory 704, e.g., random access memory (RAM) and/or read only memory (ROM), a packet processing module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 700 depicted in FIG. 7 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for vending network access, comprising:
   determining access prices for each of a plurality of network access regions based on at least one network operating condition, the at least one network operating condition comprising a congestion level; and
   offering network region access in accordance with said access prices, wherein offering network region access comprises propagating said access prices toward a set of access purchasers, wherein said access purchasers comprise at least one of an application provider or a service provider;
   wherein the network region access is offered via an application programming interface (API) exposed to the access purchasers via a web services gateway, wherein the web services gateway interacts with the access purchasers to form an access marketplace providing undated network access pricing for at least a portion of the network access regions.

2. The method of claim 1, wherein said network access regions comprise a region serviced by one or more of an eNodeB, an eNodeB cell, a NodeB, a Node B cell, a BTS, or a BTS Cell.

3. The method of claim 1, wherein said network access regions comprise a region serviced by an eNodeB cell.

4. The method of claim 1, wherein said at least one network operating condition further comprises one or more of a quality of service level, an access technology, or a target subscriber level of activity.

5. The method of claim 1, wherein said access prices are adapted in response to an acceptance of advertising.

6. The method of claim 1, wherein a first price tier for network region access is associated with a first quality of service (QoS) level and a second price tier for network region access is associated with a second QoS level.

7. The method of claim 6, wherein the first QoS level comprises a guaranteed bandwidth allocation.

8. The method of claim 1, further comprising:
   propagating, toward the set of access purchasers, meltadata indicative of respective user equipment associated with said plurality of network access regions.

9. The method of claim 1, further comprising:
   receiving an access purchase request indicative of an acceptance of offered network access at said access prices by one of the access purchasers; and
   adapting a Charging Rules Function to cause said network access requested in the access purchase request to be charged to said one of the access purchasers.

10. The method of claim 9, further comprising adapting a Policy Rules Function to select a quality of service (QoS) level for content provided via said network access requested in the access purchase request.

11. The method of claim 1, wherein offering network region access further comprises:
    propagating, toward the set of access purchasers for one of the network access regions, metadata associated with the one of the network access regions.

12. The method of claim 11, wherein the metadata associated with the one of the network access regions comprises at least one of information indicative of an access technology of the one of the network access regions or information indicative of user equipment associated with the one of the network access regions.

13. An apparatus for vending network access, the apparatus comprising:
    a processor and a memory communicatively connected to the processor, the processor configured to:
       determine access prices for each of a plurality of network access regions based on at least one network operating condition, the at least one network operating condition comprising a congestion level; and
       offer network region access in accordance with said access prices, wherein, to offer network region access, the processor is configured to propagate said access prices toward a set of access purchasers, wherein said access purchasers comprise at least one of an application provider or a service provider;
    wherein the processor is configured to offer the network region access via an application programming interface (API) exposed to the access purchasers via a web services gateway, wherein the web services gateway is configured to interact with the access purchasers to form an access marketplace providing updated network access pricing for at least a portion of the network access regions.

14. The apparatus of claim 13, wherein said network access regions comprise one or more of an eNodeB, an eNodeB cell, a NodeB, a Node B cell, a BTS, or a BIS Cell.

15. The apparatus of claim 13, wherein said at least one network operating condition further comprises one or more of a quality of service level, an access technology, or a target subscriber level of activity.

16. A non-transitory computer readable storage medium including software instructions which, when executed by a processor, cause the processor to perform a method, the method comprising:
    determining access prices for each of a plurality of network access regions based on at least one network operating condition, the at least one network operating condition comprising a congestion level; and
    offering network region access in accordance with said access prices, wherein offering network region access comprises propagating said access prices toward a set of access purchasers, wherein said access purchasers comprise at least one of an application provider or a service provider;
    wherein the network region access is offered via an application programming interface (API) exposed to the access purchasers via a web service gateway, wherein the web services gateway interacts with the access purchasers to form an access marketplace providing updated network access pricing for at least a portion of the network access regions.

17. A computer program product comprising a non-transitory computer readable storage medium storing software instructions which, when executed by a computer, cause the computer to perform a method, the method comprising:
    determining access prices for each of a plurality of network access regions based on at least one network operating condition, the at least one network operating condition comprising a congestion level; and
    offering network region access in accordance with said access prices, wherein offering network region access comprises propagating said access prices toward a set of access purchasers, wherein said access purchasers comprise at least one of an application provider or a service provider;

wherein the network region access is offered via an application programming interface (API) exposed to the access purchasers via a web services gateway, wherein the web services gateway interacts with the access purchasers to form an access marketplace providing updated network access pricing for at least a portion of the network access regions.

* * * * *